Aug. 30, 1927.
E. W. BREISCH ET AL
1,640,561
VARIABLE CONDENSER
Filed July 24, 1925
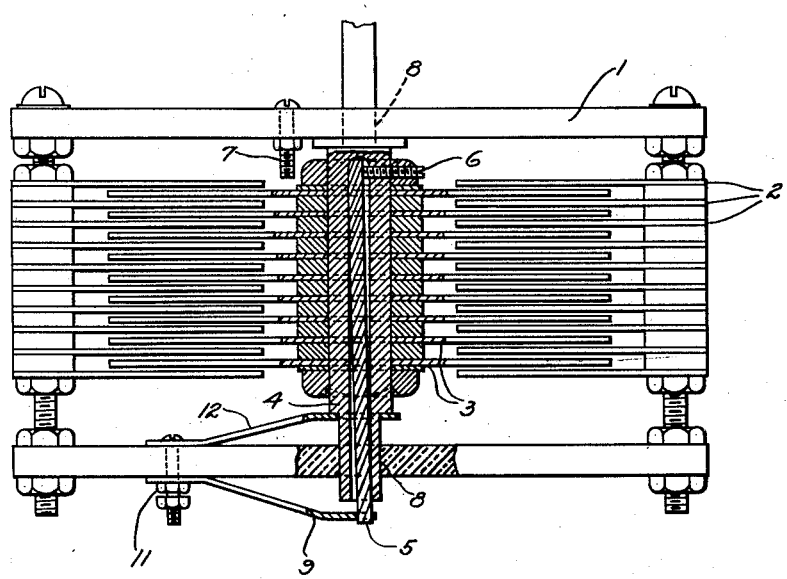
WITNESSES:
INVENTORS
Edgar W. Breisch &
Lawrence R. Golladay.
BY
ATTORNEY Patented Aug. 30, 1927.

1,640,561

UNITED STATES PATENT OFFICE.

EDGAR W. BREISCH, OF EDGEWOOD PARK, AND LAWRENCE R. GOLLADAY, OF EAST PITTSBURGH, PENNSYLVANIA, ASSIGNORS TO WESTINGHOUSE ELECTRIC & MANUFACTURING COMPANY, A CORPORATION OF PENNSYLVANIA.

VARIABLE CONDENSER.

Application filed July 24, 1925. Serial No. 45,728.

Our invention relates to terminal connections for the rotating parts of electrical instruments, and it has particular relation to connections for variable-capacity electrical condensers.

Heretofore, the connections for the rotatable parts of electrical instruments, such as the variometers and variable condensers utilized in radio reception, have been made either through the bearings or by pigtail connections consisting of fine-wire helical springs. The bearing connections involve sliding contacts which will be elimnated, in the better receiving sets of the future, on account of the magnitude and the variableness of their resistances, resulting in noises in the receiving instrument. Pigtails are objectionable because of their liability to deformation durng shipment and because of the possibility of noises being introduced by reason of accidental contact between the turns of the pigtail.

According to our invention, the foregoing difficulties are avoided by utilizing a current-conducting shunt which does not vary in inductance, which does not appreciably change in mechanical shape regardless of the movement of the condenser plates, and which has no sliding contacts.

In particular, our construction embodies the utilization of a hollow shaft for supporting the rotor member, and a twistable conductor, such as a stranded copper cable, disposed within the hollow shaft, the inner end of the twistable conductor being connected to the shaft, and the outer end of the twistable conductor being connected to a spring terminal connection mounted on the stator frame.

Our invention is illustrated, in a preferred embodiment, in the accompanying drawing, the single figure of which is a longitudinal, sectional view thereof.

The variable condenser shown in the drawing comprises a stationary insulating frame member 1 carrying a plurality of spaced stationary condenser plates 2 which cooperate with spaced rotor plates 3. The rotor plates are mounted on a hollow shaft 4 within which is disposed a stranded copper cable 5. The inner end of the cable is secured within the shaft by means of a set-screw 6 which also serves the purpose of a stop-pin cooperating with a pin or projection 7 on the stator member, whereby the rotation of the rotor member is limited to less than 360°.

The stationary frame 1 is provided with bearings 8 for supporting the shaft 4.

The free end of the stranded copper cable extends beyond the end of the shaft and is joined to a leaf-spring terminal member 9 which serves the double purpose of holding the stranded cable taut and conducting the current to a terminal binding post 11 supported by the frame 1. A second leaf spring member 12 is also shown for the purpose of providing a small amount of friction for holding the rotor member in adjusted position.

It will be perceived that we have provided, in our shunt stranded cable or connection, a rugged connecting member which is not susceptible to deformation during packing and shipment and which avoids all change of resistance and inductance due to the rotation of the shaft.

We claim as our invention:

1. An electrical instrument having a rotating electrical part mounted for limited rotative movement, a hollow shaft supporting said rotating part, a stationary frame member including a bearing for said hollow shaft, a flexible connecting conductor disposed within said shaft, the inner end of said flexible conductor being conductively connected to the shaft and turning therewith, the outer end of said flexible conductor being held against turning, and a terminal conductor mounted on said frame member and secured to said outer end of the flexible conductor.

2. An electrical instrument having a rotating electrical part mounted for limited rotative movement, a hollow shaft supporting said rotating part, a stationary frame member including a bearing for said hollow shaft, a flexible connecting conductor disposed within said shaft, the inner end of said flexible conductor turning with the shaft and the outer end of said flexible conductor being held against turning, and spring means for holding said flexible conductor taut.

3. A variable electrical condenser comprising one or more stationary plates and one or more rotatable plates mounted for a limited rotative movement in spaced relation thereto, a hollow shaft supporting said rotating plates, a stationary frame member including a bearing for said hollow shaft, a flexible connecting conductor disposed within said shaft, the inner end of said flexible conductor being conductively secured to said shaft, and a terminal means mounted on said frame member and secured to the outer end of said flexible conductor.

4. A variable electrical condenser comprising one or more stationary plates and one or more rotatable plates mounted for a limited rotative movement in spaced relation thereto, a hollow shaft supporting said rotating plates, a stationary frame member including a bearing for said hollow shaft, a twistable connecting conductor disposed within said shaft, the inner end of said twistable conductor being secured to said shaft, and a terminal means mounted on said frame member and secured to the outer end of said twistable conductor, said terminal means including means for resiliently holding said twistable conductor taut.

In testimony whereof, we have hereunto subscribed our names this 11th day of July, 1925.

EDGAR W. BREISCH.
LAWRENCE R. GOLLADAY.